Sept. 2, 1969         P. U. POULSEN         3,464,879
DRIVEN MANDREL ROTATABLE ABOUT ITS LONGITUDINAL AXIS
FOR CONTINUOUS PRODUCTION OF TUBING IN RUNNING
LENGTHS, PREFERABLY GLASS FIBRE REINFORCED
PLASTIC TUBING Filed Aug. 28, 1968         2 Sheets-Sheet 2

United States Patent Office 3,464,879
Patented Sept. 2, 1969

3,464,879
DRIVEN MANDREL ROTATABLE ABOUT ITS LONGITUDINAL AXIS FOR CONTINUOUS PRODUCTION OF TUBING IN RUNNING LENGTHS, PREFERABLY GLASS FIBRE REINFORCED PLASTIC TUBING
Peder Ulrik Poulsen, 4 Mollevej, 2800 Lyngby, Denmark
Filed Aug. 28, 1968, Ser. No. 756,052
Claims priority, application Denmark, Sept. 1, 1967, 4,407/67
Int. Cl. B65h 81/08; B29d 23/12
U.S. Cl. 156—425          1 Claim

ABSTRACT OF THE DISCLOSURE

A driven mandrel rotatable about its longitudinal axis for continuous production of tubing in running lengths, preferably glass fibre reinforced plastic tubing, the mandrel having a plurality of endless ball belts supporting the outer mandrel wall along its periphery.

---

Figure 1:
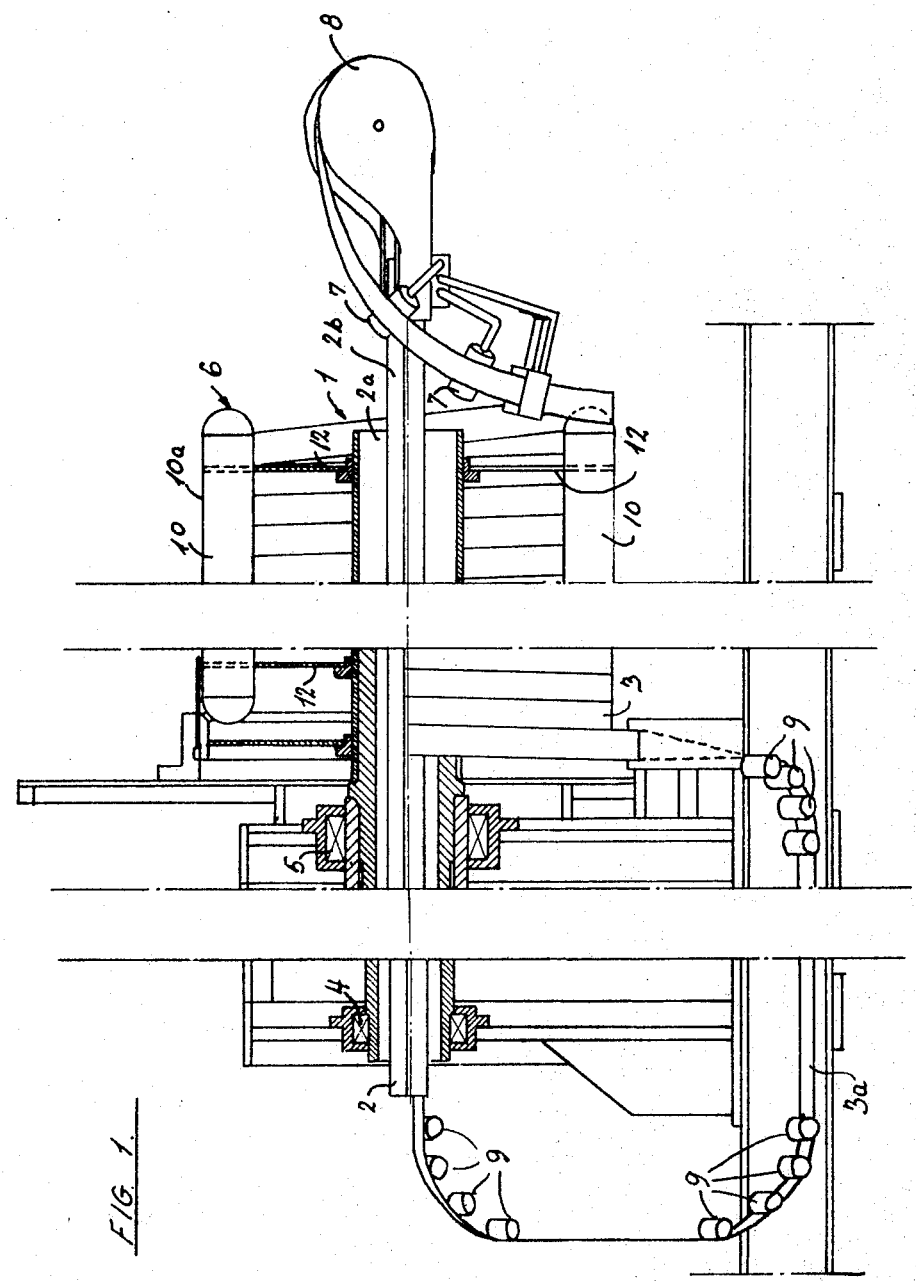

This invention relates to a driven mandrel for continuous production of tubing of indefinite length, preferably glass fibre reinforced plastic tubing and is of the type which is rotatable about its longitudinal axis and which comprises a tubular mandrel core projecting at one end beyond the mandrel bearings, an outer wall surrounding and spaced from the projecting end of the core, on the outer surface of which the tubing is formed and which is constituted by an endless strip that is being wound continuously and helically in the direction towards the free end of the mandrel core with a pitch corresponding to the strip width so that the convolutions will be disposed in edge to edge relationship. From the free core end the strip is carried through the mandrel core and back to the point where the winding commenced, and to the mandrel core are attached support means for the outer mandrel wall, on which the strip is being wound in the manner described.

To the outer surface of the outer wall of such a mandrel a material, preferably a thermosetting, glass fibre reinforced plastic material of suitable consistency, is applied in conventional manner. By the rotation of the mandrel, if desired in conjunction with conventional distributing and shaping means, the plastic material on the mandrel is caused to form a tubular sheathing which encloses the mandrel wall and is advanced continuously towards the free end of the mandrel core and beyond that end by the continuous movement of the convolutions forming the outer mandrel wall caused by the rotation of the mandrel. After setting the produced tubing is cut to desired lengths.

In the known mandrels of this type, which are also termed winding mandrels, the support means of the endless strip are usually formed as rails attached to the mandrel core and extending in the entire length of the mandrel wall and the outer surface of which engages the inner surface of the outer mandrel wall, supporting the mandrel wall so as to maintain the shape required for producing faultless plastic tubing, for instance an approximately circular cylindrical form. The rails are spaced from each other a peripheral distance determined by the rigidity of the winding strip.

Support means in the form of such rails, however, involve considerable friction between the strip contact faces of the rails and the convolutions as the convolutions advance towards the free core end during the rotation of the mandrel. On account of this friction a considerable amount of driving energy is required for rotating the mandrel. And the friction may not even be uniform everywhere and thus cause intervals between the convolutions. In that case plastic material will penetrate through the openings in the outer mandrel wall and result in undesirable fins on the inner surface of the cured plastic tube.

To reduce this deleterious friction, the said rails have in other known winding mandrels been replaced by endless support belts or chains disposed on the mandrel core, see for instance U.S. Patent No. 3,004,585, FIGS. 5 and 8, with a belt or chain portion projecting from the outer surface of the mandrel core for supporting the wound strip forming the outer mandrel wall. The projecting portion of each support belt or chain is guided in a longitudinally extending groove in the mandrel core supported in its entire length by engagement with the groove bottom, on which it slides when the belt or chain portion is advanced in the longitudinal direction of the mandrel on contact with the winding strip. But even in such an arrangement there will be considerable friction between the side edges of the support belt and the side walls of the groove and particularly between the groove bottom and the support belt, which friction impedes the free movement of the strip convolutions towards the free core end.

It is the aim of the present invention to overcome these drawbacks by supporting the strip convolutions forming the outer mandrel wall in a manner permitting frictionless movement in the longitudinal direction of the mandrel and at the same time providing maximum resistance to undesirable movement of the convolutions in peripheral direction relatively to the support means. This has been achieved according to the invention by providing support means for the outer mandrel wall consisting of a plurality of endless ball belts spaced along the periphery of the mandrel and each comprising a belt portion extending in the entire length of the mandrel wall and balls which engage the inner surface of the mandrel wall and which are supported solely by two stationary faces extending in the entire length of the mandrel wall and the two ball contact points of which are disposed at either side of and at the same distance from the plane extending in the longitudinal direction of the ball belt through the ball centre and through the contact point between the ball and the outer mandrel wall. Here the band convolutions can move practically frictionless in the longitudinal direction of the mandrel, while the balls will cause considerable resistance to movement between the outer mandrel wall and the balls circulating with the wall about the mandrel axis in any other direction in the contact plane between the balls and the mandrel wall, in that the roll of the balls is frictionless only in the longitudinal direction of the ball belt. The balls are guided reliably in transverse direction solely by means of the two stationary inclined faces. The wedge effect between the two inclined faces and the balls urged against the two faces by the outer mandrel wall results in increased frictional resistance when the strip convolutions tend to turn the balls in any other direction than the one desired: the moving direction of the convolutions, in which the balls, as already stated, may roll frictionless on their two support faces.

The invention will be explained here with reference to the drawings, in which—

Figure 2:
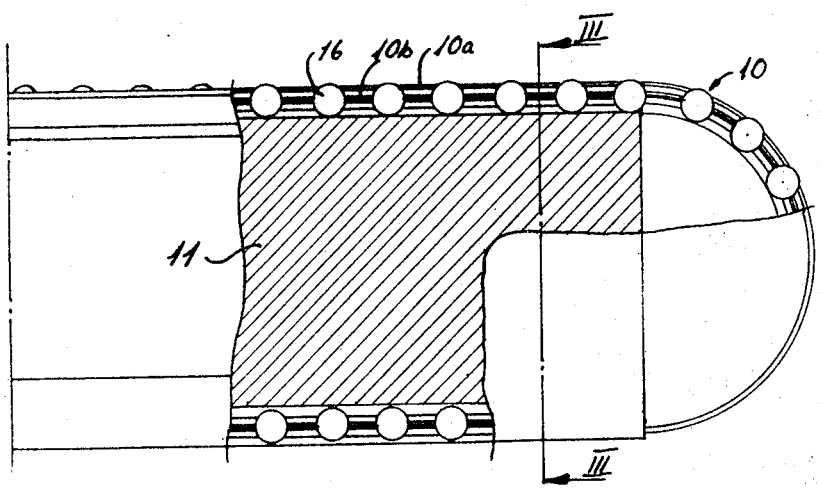
Figure 3:
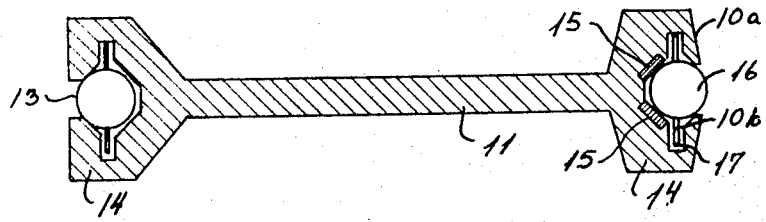

FIG. 1 shows an embodiment of the mandrel according to the invention viewed in side elevation and partly in section, FIG. 2 shows in larger measure and partially in section part of a support member for supporting the outer mandrel wall, and FIG. 3 in still larger measure a section along the line III—III in FIG. 2.

FIG. 1 shows a mandrel 1 for continuous production of plastic tubing of indefinite length. The mandrel comprises a tubular mandrel core 2 and a circular-cylindrical outer wall 3 concentrically surrounding and spaced from the core. The mandrel core 2 is rotatable in two bearings 4 and 5, of which one (4) is positioned at one end of the mandrel core, while the other 5 is positioned so that the mandrel core has a section 2a extending free of the bearings. The mandrel is adapted for rotation about its longitudinal axis by means of a driving device not shown here.

The outer wall 3 of the mandrel is formed by an endless mirror-finish steel strip 3a which on the rotation of the mandrel core, by means of guide members (not shown here) opposite the root of the freely projecting core section is being wound helically in the direction from left to right in FIG. 1 on support means 6 attached to the mandrel core. The strip convolutions on the support means are being wound by means of the guide members with a pitch corresponding to the strip width so that the convolutions will be disposed in edge to edge relationship and form an unbroken, smooth outer mandrel wall.

By the rotation of the mandrel the strip convolutions are moved towards the right hand side in FIG. 1 until they reach the free end of the mandrel core, where the strip is received by guide reels 7 and led to a reversing reel 8, which is rotatably mounted on an extension member 2b projecting axially from the free end of the core tube. The axis of rotation of the reversing reel 8 is disposed adjacent to the longitudinal axis of the mandrel. By means of the reversing reel 8 the strip is carried back in known manner through the hollow core of the mandrel, from the rear end of which the strip by means of guide reels 9 is led in a loop to the point at the root of the freely projecting section of the mandrel core where the winding of the strip on the support means is commenced.

The support means 6 attached to the mandrel core and on which the steel strip is being wound in the manner described to form the outer mandrel wall each comprises an endless ball belt 10, FIG. 2, mounted in a ball belt support 11 of I-shaped cross-section, see also FIG. 3, the longitudinal central axis of which is disposed in a plane through the longitudinal axis of the mandrel. The ball belt supports 11 are secured to the mandrel core by means of discs 12, as shown in FIG. 1. The ball belts 10 are spaced uniformly along the periphery of the mandrel so that the balls 16 of the outer belt section 10a are in contact with the inner surface of the steel strip convolutions forming the outer mandrel wall.

The ball carrier itself is designated 10b and is displaceable in the travelling direction of the belt in two slotted guides 17 disposed opposite each other at either side of the ball in the ball support 11. The slots open in a recess 13 in a peripheral outer edge flange 14 on the ball support 11 adapted to receive the balls 16.

At the bottom of the recess 13 in the portion of the edge flange 14 of the ball support in which the outer belt portion of the ball belt supporting the outer mandrel wall is disposed there are two longitudinally extending guide rails 15 extending in the entire length of the outer mandrel wall and having a plane contact surface engaging the balls. The rails are disposed angularly in the manner shown in FIG. 3 so that their two points of contact with each ball 16 are uniformly spaced from and disposed at either side of the plane extending in the longitudinal direction of the said ball belt section and passing through the ball centre and the contact point between the ball and the inner surface of the outer mandrel wall.

When the balls are caused to rotate each in its hole in the ball carrier by the movement of the convolutions of the outer mandrel wall in the longitudinal direction of the mandrel, the balls will roll frictionless on the two rails 15 along two rolling circles on the ball surfaces, each of which circles is disposed in a plane parallel to the plane extending in the longitudinal direction of the ball belt section and passing through the ball centre and the contact point between the ball and the outer mandrel wall. The rolling circles at either side of the said plane are at the same distance therefrom, and this is a condition for the frictionless rolling of the balls in the said direction on the two rails 15.

But when the steel strip convolutions wound onto the support means and forming the outer mandrel wall tend to turn the balls in any but the desired direction the balls will yield considerable resistance they must be caused to slide on the two rails in their contact points therewith. Before the balls can be rotated in the said undesirable direction relating to the rails the friction between balls and rails must be overcome. This friction is considerable on account of the wedge effect between the inclined rails and the ball held against the ball contact face of the rails under the influence of pressure from the outer mandrel wall. In this manner each ball will yield considerable resistance when the strip convolutions tend to move in any but the axial direction, for instance peripherally, relatively to the balls.

What I claim is:

1. A driven mandrel rotatable about its longitudinal axis for continuous production of tubing in running lengths, preferably glass fibre reinforced plastic tubing, and comprising a tubular mandrel core with a core section extending free of the bearing means of the mandrel, and outer mandrel wall spaced from and surrounding said core section and on the outer surface of which the tubing is formed, said outer wall being formed by an endless strip which is being wound continuously and helically in the direction towards the free end of the mandrel core with a pitch corresponding to the strip width so that the convolutions will be disposed in edge to edge relationship and which is returned from the free core end through the hollow core to the point where the winding starts, and support means for the outer mandrel wall secured to the mandrel core and on which the strip is being wound in the manner described, characterized in that the support means for the outer mandrel wall consist of a plurality of endless ball belts spaced along the mandrel periphery and each comprising a belt section extending in the entire length of the mandrel wall, the balls of which engage the inner surface of the mandrel wall, being supported solely by two stationary faces extending the entire length of the mandrel wall and the two ball contact points of which are disposed at the same distance from and at either side of the plane extending in the longitudinal direction of the ball belt section and passing through the ball centre and the point of contact between the ball and the outer mandrel wall.

References Cited

UNITED STATES PATENTS

| 2,845,109 | 7/1958 | Schneider | 156—429 |
| 3,004,585 | 10/1961 | Lewis et al. | 156—429 |
| Re. 25,457 | 10/1963 | Lewis et al. | 156—425 |
| 3,367,815 | 2/1968 | Ragettli et al. | 156—429 X |

J. HOWARD FLINT, JR., Primary Examiner

U.S. Cl. X.R.

18—45; 156—429